United States Patent
Carolan et al.

[11] Patent Number: 6,056,807
[45] Date of Patent: *May 2, 2000

[54] FLUID SEPARATION DEVICES CAPABLE OF OPERATING UNDER HIGH CARBON DIOXIDE PARTIAL PRESSURES WHICH UTILIZE CREEP-RESISTANT SOLID-STATE MEMBRANES FORMED FROM A MIXED CONDUCTING MULTICOMPONENT METALLIC OXIDE

[75] Inventors: Michael Francis Carolan; Paul Nigel Dyer, both of Allentown; Stephen Andrew Motika, Kutztown; Patrick Benjamin Alba, Wyoming, all of Pa.

[73] Assignee: Air Products and Chemicals, Inc., Allentown, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/013,420

[22] Filed: Jan. 26, 1998

[51] Int. Cl.[7] .................................................. B01D 53/22
[52] U.S. Cl. ........................................ 96/4; 95/54; 96/11
[58] Field of Search ................................ 95/54; 96/4, 11

[56] References Cited

U.S. PATENT DOCUMENTS

| | | | |
|---|---|---|---|
| 4,902,420 | 2/1990 | Pall et al. | 210/346 |
| 5,108,465 | 4/1992 | Bauer et al. | 55/16 |
| 5,240,473 | 8/1993 | Carolan et al. | 95/54 |
| 5,240,480 | 8/1993 | Thorogood et al. | 96/4 |
| 5,261,932 | 11/1993 | Carolan et al. | 95/54 |
| 5,269,822 | 12/1993 | Carolan et al. | 95/54 |
| 5,306,411 | 4/1994 | Mazanec et al. | 204/265 |
| 5,356,728 | 10/1994 | Balachandran et al. | 429/8 |
| 5,516,359 | 5/1996 | Kang et al. | 95/14 |
| 5,534,471 | 7/1996 | Carolan et al. | 502/4 |
| 5,565,017 | 10/1996 | Kang et al. | 95/14 |
| 5,569,633 | 10/1996 | Carolan et al. | 502/4 |
| 5,580,497 | 12/1996 | Balachandran et al. | 252/519 |
| 5,599,383 | 2/1997 | Dyer et al. | 96/11 X |
| 5,648,304 | 7/1997 | Mazanec et al. | 96/4 X |
| 5,657,624 | 8/1997 | Kang et al. | 60/39.02 |
| 5,681,373 | 10/1997 | Taylor et al. | 96/11 |
| 5,702,999 | 12/1997 | Mazanec et al. | 96/4 X |
| 5,712,220 | 1/1998 | Carolan et al. | 96/4 X |
| 5,723,035 | 3/1998 | Mazanec et al. | 96/11 X |
| 5,733,435 | 3/1998 | Prasad et al. | 96/4 X |
| 5,788,748 | 8/1998 | Mazanec et al. | 96/4 |
| 5,817,597 | 10/1998 | Carolan et al. | 96/4 X |
| 5,820,654 | 10/1998 | Gottzman et al. | 96/11 X |
| 5,846,641 | 12/1998 | Abeles et al. | 96/4 X |

FOREIGN PATENT DOCUMENTS

| | | |
|---|---|---|
| 9424065 | 10/1994 | European Pat. Off. |
| 0 732 138 A2 | 9/1996 | European Pat. Off. |
| 8130018 | 5/1996 | Japan. |

OTHER PUBLICATIONS

Tabata and coworkers (J. Mat. Sci., 22 (1987) 1882–1886).
F. Morin and coworkers (Solid State Ionics 96 (1997) 129–139).
D. Waller and coworkers (Materials Letters 27 (1996) 225–228).
P. P. Zhuk, et al., "Properties of Iron–Doped Lanthanum Chromite", Izvestiyn Akademii Nauk SSR, Neorganicheskie Materialy, vol. 24, No. 1, pp. 105–108.

*Primary Examiner*—Robert Spitzer
*Attorney, Agent, or Firm*—Keith D. Gourley

[57] ABSTRACT

The present invention presents a fluid separation device capable of separating oxygen from an oxygen-containing gaseous mixture which utilizes at least one solid-state membrane comprising a dense mixed conducting multicomponent metallic oxide layer formed from a mixed conducting multicomponent metallic oxide represented by the formula $$Ln_x A'_{x'} A''_{x''} B_y B'_{y'} O_{3-z},$$

wherein Ln is an element selected from the f block lanthanides, A' is selected from Group 2, A" is selected from Groups 1, 2 and 3 and the f block lanthanides, and B,B' are independently selected from the d block transition metals, excluding titanium and chromium, wherein $0 \leq x < 1$, $0 < x' \leq 1$, $0 \leq x'' < 1$, $0 < y < 1.1$, $0 \leq y' < 1.1$, $x + x' + x'' = 1.0$, $1.1 > y + y' > 1.0$ and z is a number which renders the compound charge neutral. The subject mixed conducting multicomponent metallic oxides demonstrate improved resistance to degradation by carbon dioxide and sulfur dioxide and improved oxygen flux and reduced creep rates at operating temperature.

8 Claims, 1 Drawing Sheet

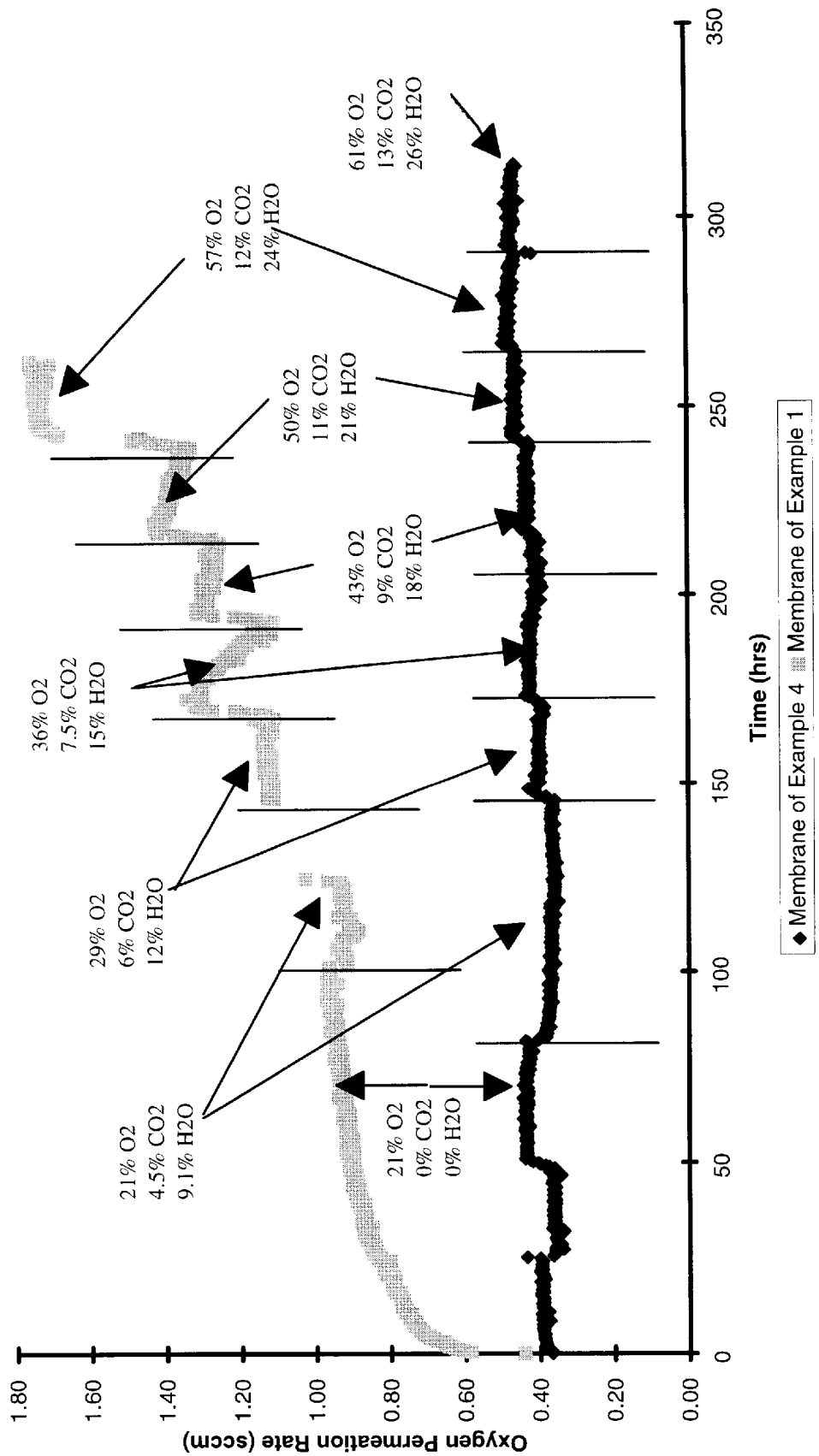

FLUID SEPARATION DEVICES CAPABLE OF OPERATING UNDER HIGH CARBON DIOXIDE PARTIAL PRESSURES WHICH UTILIZE CREEP-RESISTANT SOLID-STATE MEMBRANES FORMED FROM A MIXED CONDUCTING MULTICOMPONENT METALLIC OXIDE

This invention was made with United States government support under NIST ATP Award 70NANB4H1503, awarded by the National Institute of Standards and Technology.

BACKGROUND OF THE INVENTION

Solid state membranes formed from ion-conducting materials continue to show promise for use in commercial processes for separating and recovering oxygen from oxygen-containing gaseous mixtures as well as for reacting oxygen formed therefrom with a feedstock comprising light hydrocarbons such as methane, natural gas, ethane or any available light hydrocarbon mixture. Representative solid-state membranes are those formed from mixed conducting multicomponent metallic oxides which are typically operated at high temperatures (e.g. 600° C. or more) wherein the membranes conduct both oxygen ions and electrons. When a difference in oxygen partial pressure exists on opposite sides of the multicomponent metallic oxide membrane and operating conditions are properly controlled, oxygen is transported in the form of oxygen ions from the high oxygen partial pressure side to the low oxygen partial pressure side of the membrane while an electron flux occurs in the opposite direction of oxygen ion migration in order to conserve charge, producing pure oxygen on the permeate side of the membrane.

Fluid separation devices which employ solid-state membranes must exhibit a variety of mechanical and physical properties in order to provide sufficient operating life and to perform according to desired operating specifications. Fluid separation devices should be capable of being subjected to elevated carbon dioxide and water partial pressures without observing any appreciable loss in oxygen transport properties such as in the case wherein the device is heated by direct firing of a fluid feedstream which produces carbon dioxide, water and sulfur dioxide. Unfortunately, typical multicomponent metallic oxides known in the art provide varying degrees of these essential attributes.

In typical processes which employ fluid separation devices, a pressure differential exists across the solid-state membrane. Numerous multicomponent metallic oxides exhibit excessive creep at elevated temperature which may cause the solid-state membrane to deform and ultimately crack under an applied pressure differential. Some multicomponent metallic oxides degrade in the presence of sulfur dioxide at elevated temperatures. Therefore, the ceramist must endeavor to optimize the composition of such materials to achieve acceptable levels of each of the identified mechanical and physical properties.

Tabata and coworkers (J. Mat. Sci., 22 (1987) 1882–1886) investigated the surface chemical states of the perovskite-type compound, strontium-doped lanthanum cobalt oxides ($La_{1-x}Sr_xCoO_3$) utilizing X-ray photoelectron spectroscopy. Catalytic oxidations of both methane and carbon monoxide were also studied using various flow methods.

U.S. Pat. No. 5,261,932, assigned to Air Products and Chemicals, Inc., presents a process for recovering oxygen from an oxygen-containing gaseous mixture containing one or more components selected from water, carbon dioxide or a volatile hydrocarbon. The process utilizes ion transport membranes comprising a stoichiometric multicomponent metallic oxide containing strontium, calcium or magnesium. The process utilizes a temperature regime which overcomes problems associated with degradation of strontium-, calcium- and magnesium-containing multicomponent oxides caused by carbon dioxide. Preferred stoichiometric multicomponent metallic oxides are represented by the structure $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0 \leq x \leq 1$, $0 \leq x' \leq 1$, $0 \leq x'' \leq 1$, $0 < y \leq 1$, $0 \leq y' \leq 1$, $0 \leq y'' \leq 1$, $x+x'+x''=1$, $y+y'+y''=1$ and z is a number which renders the compound charge neutral. Preferably, A, A' or A" of the enumerated structure is a Group 2 metal selected from the group consisting of calcium, strontium and magnesium.

U.S. Pat. No. 5,269,822, also assigned to Air Products and Chemicals, Inc., presents a process for recovering oxygen from an oxygen-containing gaseous mixture containing one or more components selected from water, carbon dioxide or a volatile hydrocarbon. The process utilizes ion transport membranes comprising a stoichiometric multicomponent metallic oxide containing barium and a temperature regime which overcomes problems associated with degradation of barium-containing multicomponent metallic oxides caused by carbon dioxide. Preferred stoichiometric multicomponent metallic oxides are represented by the structure $A_xBa_xB_yB'_{y'}B''_{y''}O_{3-z}$, where A is chosen from the group comprising Groups 1, 2 and 3 and the F block lanthanides with the proviso that A is not yttrium; and B,B',B" are chosen from the D block transition metals according to the Periodic Table of the Elements adopted by the IUPAC wherein $0 \leq x \leq 1$, $0 < x' \leq 1$, $0 < y \leq 1$, $0 \leq y' \leq 1$, $0 \leq y'' \leq 1$, $x+x'=1$, $y+y'+y''=1$ and z is a number which renders the compound charge neutral.

U.S. Pat. Nos. 5,356,728 and 5,580,497 and European Patent Application WO 94/24,065 disclose cross-flow electrochemical reactor cells formed from multicomponent metallic oxides of the perovskite structure which demonstrate both electron conductivity and oxygen ion conductivity at elevated temperatures. Such cells are useful in carrying out partial oxidation reactions of organic compounds to form added-value products and separating oxygen from oxygen-containing gaseous mixtures. Suitable multicomponent metallic oxides are represented by

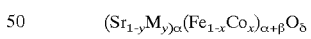

where M is a metal selected from the group consisting of elements having atomic number in a range from 56 to 71, calcium, and yttrium, x is a number in a range from about 0.01 to about 0.95, y is a number in a range from about 0.01 to about 0.95, α is a number in a range from about 1 to about 4, β is a number in a range upward from 0 to about 20, such that $$1.1 \leq (\alpha+\beta)/\alpha \leq 6,$$

and δ is a number which renders the compound charge neutral, and wherein the composition has a non-perovskite structure.

U.S. Pat. No. 5,306,411 discloses a solid multicomponent membrane for use in an electrochemical reactor characterized by (1) an intimate, gas-impervious, multi-phase mixture of an electronically-conductive phase and an oxygen ion-conductive phase wherein at least one of said phases is a mixed metal oxide having a perovskite structure represented by the formula

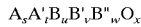

wherein A represents a lanthanide, Y, or mixture thereof; A' represents an alkaline earth metal or mixture thereof; B represents Fe; B' represents Cr, Ti, or mixture thereof and B" represents Mn, Co, V, Ni or Cu, or a mixture thereof; and s, t, u, v, w, and x each represent a number such that:
s/t equals from about 0.01 to about 100;
u equals from about 0.01 to about 1;
v equals from about 0.01 to 1;
w equals from zero to about 1;
x equals a number that satisfies the valences of the A, A', B, B' and B" in the formula; and
$0.9 < (s+t)/(u+v+w) < 1.1$;
or (2) a mixed metal oxide material having a perovskite structure represented by the formula

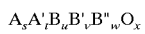

wherein A represents a lanthanide or Y, or a mixture thereof; A' represents an alkaline earth metal or a mixture thereof; B represents Fe, B' represents Cr or Ti, or a mixture thereof; and B" represents Mn, Co, V, Ni or Cu, or a mixture thereof and s, t, u, v, w, and x each represent a number such that:
s/t equals from about 0.01 to about 100;
u equals from about 0.01 to about 1;
v equals from about 0.01 to 1;
w equals from zero to about 1;
x equals a number that satisfies the valences of the A, A', B, B' and B" in the formula; and
$0.9 < (s+t)/(u+v+w) < 1.1$.

F. Morin and coworkers (Solid State Ionics 96 (1997) 129–139) studied the phase stability of $La_{0.5}Sr_{0.5}CoO_{3-\delta}$ (strontium-substituted lanthanum cobaltite). In preparing various $ABO_3$ compounds with A=La and Sr and B=Co or Mn, the researchers found that strontium-substituted lanthanum cobaltite has much less tolerance for any variation in the A/B ratio than its manganite counterpart. This is specifically demonstrated for $La_{0.5}Sr_{0.5}CoO_{3-\delta}$ where distinct phases readily appear on either sides of the A/B ratio for any small departure of this ratio from unity. These secondary phases are clearly evidenced by scanning electron microscopy and X-ray diffraction. The same observations have been extended to various degrees of strontium substitution between $0.4 \leq x \leq 0.6$. The researchers also provide additional data in regard to the main phase stability as a function of the oxygen partial pressure at temperatures up to 1425° C.

D. Waller and coworkers (Materials Letters 27 (1996) 225–228) discuss the structure of and reaction of A-site deficient perovskites. Lanthanum strontium cobalt iron oxides with the perovskite structure were synthesized using citrate and glycine complexation methods. Low temperature calcination of the precursor phases was stated to lead to the formation of cubic perovskites, which on high temperature calcination are stated to form rhombohedrally distorted perovskites. The cubic phase is identified as a perovskite $La_{0.6}Sr_{0.4-x}Co_{0.2}Fe_{0.8}O_{3-\delta}$, with a large degree of strontium deficiency (x=0.20 to 0.25).

Japanese Patent Application Kokai No. H8-130018 presents A-site deficient perovskites represented by the formula $A_{1-\alpha}BO_{3-\delta}$. Such materials are suitable for use as electrode material for solid electrolytes characterized by the fact that A in the formula consists of two structural elements A' and A", B consists of two structural elements B' and B", so that the general formula can be indicated by $(A'_{1-x}A"_x)_{1-\alpha}(B'_{1-y}B"_y)O_{3-\delta}$, and that A' in the formula consists of at least one selected from the group of La, Nd and Y; and A" consists of at least one selected from the group of Ba, Sr and Ca; B' is Co; and B" consists of at least one selected from the group of Mn, Fe, Ni and Cu, and the allowable ranges of $\alpha$, $\delta$, x and y are, $0<\alpha<0.2$; $0 \leq \delta \leq 1$; $0<x<1$, and $0<y<1$.

Those skilled in the art are searching for mixed conducting multicomponent metallic oxides of the perovskite-type for use in fluid separation devices which would tolerate being subjected to high carbon dioxide and water partial pressures and the presence of sulfur dioxide during operation without suffering an unacceptable loss in oxygen flux or exhibiting unexceptable creep.

BRIEF SUMMARY OF THE INVENTION

Applicants have discovered a class of mixed conducting multicomponent metallic oxides which are particularly suited toward use in fabricating the dense mixed conducting multicomponent metallic oxide layer of the solid-state membranes used in fluid separation devices such as those for separating oxygen from oxygen-containing gaseous mixtures. These compositions overcome problems associated with prior art materials by providing superior resistance to carbon dioxide and sulfur dioxide degradation while operated under process conditions of elevated carbon dioxide and water partial pressures. Moreover, the enumerated mixed conducting multicomponent metallic oxides exhibit reduced creep under operating conditions.

These fluid separation devices for separating oxygen from an oxygen-containing gaseous mixture utilize at least one solid-state membrane comprising a dense mixed conducting multicomponent metallic oxide layer formed from a mixed conducting multicomponent metallic oxide represented by the formula $Ln_xA'_xA"_xB_yB'_yO_{3-z}$, wherein Ln is an element selected from the f block lanthanides, A' is selected from Group 2, A" is selected from Groups 1, 2 and 3 and the f block lanthanides, and B and B' are independently selected from the d block transition metals, excluding titanium and chromium, wherein $0 \leq x<1$, $0<x' \leq 1$, $0 \leq x"<1$, $0<y<1.1$, $0 \leq y'<1.1$, $x+x'+x"=1.0$, $1.1>y+y'>1.0$ and z is a number which renders the compound charge neutral.

The term, fluid separation device, in its most general embodiment, means any conventional apparatus such as a reactor which is separated into a first compartment and a second compartment by the solid-state membranes of the present invention. The device typically possesses an inlet for introducing an oxygen-containing gaseous mixture into the first compartment thereby contacting the solid-state membrane and an outlet for collecting the oxygen which permeates through the solid-state membrane into the second compartment. Optionally, an inert sweep gas such as helium may be introduced in proximity to the second compartment in order to sweep oxygen away from the solid-state membrane and out of the second compartment. The fluid separation device may be fitted with conventional heating elements in order to raise the temperature of the device to temperatures sufficient to enable the solid-state membranes of the fluid separation device to separate oxygen from the oxygen-containing gaseous mixture or the device may be heated by indirect heat exchange or direct firing of the fluid mixture to be separated as is known in the art.

In a most general embodiment, suitable solid-state membranes comprise a dense mixed conducting multicomponent metallic oxide represented by the formula $Ln_xA'_xA''_xB_yB'_yO_{3-z}$, wherein Ln is an element selected from the f block lanthanides, A' is selected from Group 2, A" is selected from Groups 1, 2 and 3 and the f block lanthanides and B and B' are independently selected from the d block transition metals, excluding titanium and chromium, wherein $0 \leq x < 1$, $0 < x' \leq 1$, $0 \leq x'' < 1$, $0 < y < 1.1$, $0 \leq y' < 1.1$, $x+x'+x''=1.0$, $1.1 > y+y' > 1.0$ and z is a number which renders the compound charge neutral.

As shall be discussed in the Detailed Description of the Invention, solid-state membranes may be formed from additional layers including porous support layers which provide mechanical support for the dense mixed conducting multicomponent metallic oxide layer. Moreover, additional layers may be employed as desired in order to assist in operation of the solid-state membrane.

Suitable fluids to be separated utilizing the fluid separation devices of the present invention include oxygen-containing gaseous mixtures such as air which may also contain one or more components including carbon dioxide, sulfur dioxide, water and volatile hydrocarbons. The oxygen-containing gaseous mixtures typically contain between about 10 vol. % to 50 vol. % oxygen. The preferred oxygen-containing gaseous mixture is atmospheric air. Representative hydrocarbons include linear and branched alkanes, alkenes and alkynes having from 1 to about 6 carbon atoms and aromatics having from 6 to 8 carbon atoms. Such hydrocarbons are believed to be converted to carbon dioxide and water under the operating conditions thereby causing no adverse effect on the utility of the fluid separation device.

Applicants have further discovered that significant cost savings can be enjoyed by utilizing a mixture of lanthanides for Ln as represented by the above-mentioned formula instead of individual, highly pure lanthanides of the f block of the IUPAC Periodic Table of the Elements. For example, highly pure lanthanum oxide is substantially more expensive than a mixture of lanthanum oxide, cerium oxide, praseodymium oxide and neodymium oxide which is commercially available from Molycorp, a division of Unical Corporation, Los Angeles, Calif. Thus, Ln in the above mentioned formula may comprise a mixture of lanthanum and at least one element other than lanthanum which is selected from the f block lanthanides as represented by the IUPAC Periodic Table of the Elements.

More preferred dense mixed conducting multicomponent metallic oxides to be employed in the dense mixed conducting multicomponent metallic oxide layer of the solid-state membranes of the fluid separation device are represented by the formula $La_xA'_xA''_xCo_yFe_yO_{3-z}$ wherein A' is selected from strontium, barium, calcium or magnesium, A" is selected from Groups 1, 2 and 3 and the f block lanthanides, wherein $0 \leq x < 1$, $0 < x' < 1$, $0 \leq x'' < 1$, $0 < y < 1.1$, $0 \leq y' < 1.1$, $x+x'+x''=1.0$, $1.1 > y+y' > 1.0$ and z is a number which renders the composition charge neutral. A representative metallic oxide is $La_{0.6}Sr_{0.4}Co_{0.51}Fe_{0.51}O_{3-z}$.

Most preferred dense mixed conducting multicomponent metallic oxides are represented by the formula $Ln_xA'_xA''_xB_yO_{3-z}$, wherein Ln is an element selected from the f block lanthanides, A' is selected from Group 2, A" is selected from Groups 1, 2 and 3 and the f block lanthanides, and B is selected from the d block transition metals, excluding titanium and chromium, wherein $0 \leq x < 1$, $0 < x' \leq 1$, $0 \leq x'' < 1$, $0 < y < 1.1$, $x+x'+x''=1.0$, $1.1 > y > 1.0$ and z is a number which renders the compound charge neutral. Representative metallic oxides include $La_{0.5}Sr_{0.5}Co_{1.02}O_{3-z}$, $La_{0.6}Sr_{0.4}Co_{1.02}O_{3-z}$, $La_{0.8}Sr_{0.2}Co_{1.02}O_{3-z}$.

The fluid separation devices of the present invention utilize solid-state membranes comprising at least one solid-state membrane which comprises a dense mixed conducting multicomponent metallic oxide layer formed from a mixed conducting multicomponent metallic oxides enumerated in the present Specification tolerate being subjected to high carbon dioxide, sulfur dioxide and water partial pressures during operation without suffering an unacceptable loss in oxygen flux and without exhibiting unexceptable creep.

Applicants' invention can be more readily understood by referring to the Detailed Description of the Invention and the Figure which is attached hereto.

BRIEF DESCRIPTION OF THE DRAWING

The sole Figure illustrates the improved oxygen flux exhibited by the solid-state membranes of the claimed fluid separation device which utilize a dense mixed conducting multicomponent metallic oxide layer formed from $La_{0.6}Sr_{0.4}Co_{1.02}O_{3-z}$.

DETAILED DESCRIPTION OF THE INVENTION

Copending U.S. patent application Ser. No. 08/600,668, filed on Feb. 29, 1996, assigned to Air Products and Chemicals, Inc. (the "'668 Application"), presents novel mixed conducting multicomponent metallic oxides which are particularly suited toward use in fabricating solid-state oxygen producing devices. The multicomponent metallic oxides comprise at least three transition metals, excluding titanium and chromium, wherein the ratio of the transition metals to other metallic components ranges from greater than 1 to less than 1.1.

The compositions presented in the '668 Application are represented by the formula $Ln_xA'_xA''_xB_yB'_yB''_yO_{3-z}$, wherein Ln is an element selected from the f block lanthanides, A' is selected from Group 2, A" is selected from Groups 1, 2 and 3 and the f block lanthanides, and B,B',B" are independently selected from the d block transition metals, excluding titanium and chromium, wherein $0 \leq x < 1$, $0 < x' < 1$, $0 \leq x'' < 1$, $0 < y < 1.1$, $0 < y' < 1.1$, $0 < y'' < 1.1$, $x+x'+x''=1.0$, $1.1 > y+y'+y'' > 1.0$ and z is a number which renders the compound charge neutral wherein such elements are represented according to the Periodic Table of the Elements adopted by IUPAC.

Applicants have now discovered that by eliminating the B" element of the immediately preceding formula, and thus having only 1 or 2 B-cations (represented by B and/or B' of the preceding formula), compositions having superior properties may be obtained. More particularly, fluid separation devices formed from solid-state membranes having a dense mixed conducting multicomponent metallic oxide layer formed from Applicants' compositions presented in this Specification demonstrate higher oxygen fluxes and lower creep rates than the compositions presented in the '668 Application and provide improved resistance to degradation by sulfur dioxide.

The fluid separation devices for separating oxygen from an oxygen-containing gaseous mixture utilize at least one solid-state membrane comprising a dense mixed conducting multicomponent metallic oxide layer formed from a mixed conducting multicomponent metallic oxide represented by the formula $$Ln_xA'_{x'}A''_{x''}B_yB'_{y'}O_{3-z},$$

wherein Ln is an element selected from the f block lanthanides, A' is selected from Group 2, A" is selected from Groups 1, 2 and 3 and the f block lanthanides, and B and B' are independently selected from the d block transition metals, excluding titanium and chromium, wherein $0 \leq x < 1$, $0 < x' \leq 1$, $0 \leq x'' < 1$, $0 < y \leq y' < 1.1$, $x+x'+x''=1.0$, $1.1 > y+y' > 1.0$ and z is a number which renders the compound charge neutral.

The term, fluid separation device, in its most general embodiment, means any conventional apparatus such as a reactor which is separated into a first compartment and a second compartment by a solid-state membrane of the present invention. The device typically possesses an inlet for introducing an oxygen-containing gaseous mixture into the first compartment thereby contacting the solid-state membrane, an outlet for collecting the oxygen which permeates through the solid-state membrane into the second compartment and another outlet for removing the oxygen-depleted oxygen-containing gaseous mixture from the first compartment. Alternately, an inlet for introducing an inert sweep gas such as helium in proximity to the second compartment may be utilized in order to sweep oxygen away from the solid-state membrane and out of the second compartment. Optionally, an inlet into the second compartment may be provided to introduce a gaseous fluid which may react with oxygen permeating through the solid-state membrane and into the second compartment.

The fluid separation device may be fitted with conventional heating elements in order to raise the temperature of the device to temperatures sufficient to enable the solid-state membranes of the fluid separation device to separate oxygen from the oxygen-containing gaseous mixture or the device may be heated by indirect heat exchange as is known in the art. Alternately, the fluid may be combined with a fuel and combusted to heat the fluid to be separated to operating temperature.

Suitable fluid separation devices include the tubular solid-state membrane module presented in U.S. Pat. No. 5,599,383, assigned to Air Products and Chemicals, Inc., which presents tubular solid-state membrane modules for separating oxygen from an oxygen-containing gaseous mixture which provide improved pneumatic and structural integrity and ease of manifolding. The modules are formed from a plurality of tubular membrane units, each membrane unit which comprises a channel-free porous support having connected through porosity which is in contact with a contiguous dense mixed conducting oxide layer having no connected through porosity. The dense mixed conducting multicomponent metallic oxide layer is placed in flow communication with the oxygen-containing gaseous mixture to be separated and the channel-free porous support of each membrane unit is placed in flow communication with one or more manifolds or conduits for discharging oxygen which has been separated from the oxygen-containing gaseous mixture by permeation through the dense mixed conducting oxide layer of each membrane unit and passage into the manifolds or conduits via the channel-free porous support of each membrane unit.

Suitable fluid separation devices also include the planar solid-state membrane modules presented in U.S. Pat. No. 5,681,373, assigned to Air Products and Chemicals, Inc., which presents planar solid-state membrane modules for separating oxygen from an oxygen-containing gaseous mixture which provide improved pneumatic and structural integrity and ease of manifolding. The modules are formed from a plurality of planar membrane units, each membrane unit which comprises a channel-free porous support having connected through porosity which is in contact with a contiguous dense mixed conducting oxide layer having no connected through porosity. The dense mixed conducting multicomponent metallic oxide layer is placed in flow communication with the oxygen-containing gaseous mixture to be separated and the channel-free porous support of each membrane unit is placed in flow communication with one or more manifolds or conduits for discharging oxygen which has been separated from the oxygen-containing gaseous mixture by permeation through the dense mixed conducting multicomponent metallic oxide layer of each membrane unit and passage into the manifolds or conduits via the channel-free porous support of each membrane unit.

Suitable fluids to be separated utilizing the fluid separation devices of the present invention include oxygen-containing gaseous mixtures such as air which may also contain one or more components including carbon dioxide, sulfur dioxide, water and volatile hydrocarbons. The oxygen-containing gaseous mixtures typically contain between about 10 vol. % to 50 vol. % oxygen. The preferred oxygen-containing gaseous mixture is atmospheric air. Representative hydrocarbons which may be present in the fluid to be separated include linear and branched alkanes, alkenes and alkynes having from 1 to about 6 carbon atoms and aromatics having from 6 to 8 carbon atoms. Such hydrocarbons are believed to be converted to carbon dioxide and water under operating conditions thereby causing no adverse effect on the utility of the fluid separation device.

The driving force for separating oxygen from an oxygen-containing gaseous mixture during operation of the claimed fluid separation devices is provided by creating a difference in oxygen partial pressure on opposite sides of the solid-state membrane comprising the dense mixed conducting multicomponent metallic oxide layer. An oxygen partial pressure difference on opposite sides of the solid-state membrane can be created by compressing the oxygen-containing gaseous mixture delivered to the first compartment of the fluid separation device to a pressure sufficient to recover the oxygen permeate stream in the second compartment at a pressure of greater than or equal to about one atmosphere.

Typical pressures of the oxygen-containing gaseous mixture range from about 15 psia to about 250 psia and the optimum pressure will vary depending upon the amount of oxygen in the oxygen-containing gaseous mixture. Conventional compressors are capable of achieving the required compression. Alternately, a positive oxygen partial pressure on opposite sides of the solid-state membrane can be achieved by partially evacuating the second compartment of the device to the extent required to recover the oxygen permeate. The oxygen which has been separated from the oxygen-containing gaseous mixture can be stored in a suitable container. The oxygen permeate typically comprises pure oxygen or high purity oxygen defined as a gas generally containing at least about 90 vol. % $O_2$, preferably more than about 95 vol % $O_2$ and especially more than 99 vol. % $O_2$. Alternately, the oxygen permeate may be reacted in-situ with an oxygen-reactive feedstock which is introduced into the second compartment of the fluid separation device.

The necessary circuit of electrons to supply the ionization/deionization process occurring at the solid-state membrane is maintained internally via the electronic conductivity of the dense mixed conducting multicomponent metallic oxide layer of the solid-state membrane. Mixed conducting multicomponent metallic oxides which demonstrate both oxygen ionic conductivity and electronic conductivity typically demonstrate an oxygen ionic conductivity ranging from 0.001 ohm$^{-1}$cm$^{-1}$ to 100 ohm$^{-1}$cm$^{-1}$ and an electronic conductivity ranging from about 1 ohm$^{-1}$cm$^{-1}$ to 1000 ohm$^{-1}$cm$^{-1}$.

Turning now to the solid-state membrane to be deployed in the fluid separation devices of the present invention, the most general embodiment comprises at least one solid-state membrane comprising a dense mixed conducting multicomponent metallic oxide represented by the formula $$Ln_xA'_{x'}A''_{x''}B_yB'_{y'}O_{3-z},$$

wherein Ln is an element selected from the f block lanthanides, A' is selected from Group 2, A'' is selected from Groups 1, 2 and 3 and the f block lanthanides and B and B' are independently selected from the d block transition metals, excluding titanium and chromium, wherein $0 \leq x < 1$, $0 < x' \leq 1$, $0 \leq x'' < 1$, $0 < y < 1.1$, $0 \leq y' < 1.1$, $x+x'+x''=1.0$, $1.1 > y+y' > 1.0$ and z is a number which renders the compound charge neutral.

Applicants have further discovered that significant cost savings can be enjoyed by utilizing a mixture of lanthanides for Ln as represented by the above-mentioned formula instead of individual, highly pure lanthanides of the f block of the IUPAC Periodic Table of the Elements. For example, highly pure lanthanum oxide is substantially more expensive than a mixture of lanthanum oxide, cerium oxide, praseodymium oxide and neodymium oxide which is commercially available from Molycorp, a division of Unical Corporation, Los Angeles, Calif. Thus, Ln in the above mentioned formula may comprise a mixture of lanthanum and at least one element other than lanthanum which is selected from the f block lanthanides as represented by the IUPAC Periodic Table of the Elements.

More preferred dense mixed conducting multicomponent metallic oxides to be employed in the dense mixed conducting multicomponent metallic oxide layer of the solid-state membranes of the fluid separation device are represented by the formula $$La_xA'_{x'}A''_{x''}Co_yFe_{y'}O_{3-z}$$

wherein A' is selected from strontium, barium, calcium or magnesium, A'' is selected from Groups 1, 2 and 3 and the f block lanthanides, wherein $0 \leq x < 1$, $0 < x' < 1$, $0 \leq x'' < 1$, $0 < y < 1.1$, $0 \leq y' < 1.1$, $x+x'+x''=1.0$, $1.1 > y+y' > 1.0$ and z is a number which renders the composition charge neutral. A representative metallic oxide is $La_{0.6}Sr_{0.4}Co_{0.51}Fe_{0.51}O_{3-z}$.

Most preferred dense mixed conducting multicomponent metallic oxides are represented by the formula $$Ln_xA'_{x'}A''_{x''}B_yO_{3-z},$$

wherein Ln is an element selected from the f block lanthanides, A' is selected from Group 2, A'' is selected from Groups 1, 2 and 3 and the f block lanthanides, and B is selected from the d block transition metals, excluding titanium and chromium, wherein $0 \leq x < 1$, $0 < x' \leq 1$, $0 \leq x'' < 1$, $x+x'+x''=1.0$, $1.1 > y > 1.0$ and z is a number which renders the compound charge neutral. Representative metallic oxides include $La_{0.5}Sr_{0.5}Co_{1.02}O_{3-z}$, $La_{0.6}Sr_{0.4}Co_{1.02}O_{3-z}$, $La_{0.8}Sr_{0.2}Co_{1.02}O_{3-z}$.

The enumerated mixed conducting multicomponent metallic oxides may be prepared according to conventional methods including mixing and firing a desired stoichiometric ratio of the respective metallic oxides making up the mixed conducting multicomponent metallic oxide, thermally decomposing nitrates and acetates and utilizing the citric acid preparation method. Each of these methods is well known in the art and is suitable for making the multicomponent metallic oxides of the claimed invention.

The dense mixed conducting multicomponent metallic oxide layer of the solid-state membranes deployed in the current invention are formed from a mixture of specified metallic oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures.

The thickness of the dense mixed conducting multicomponent metallic oxide layer of the solid-state membrane can be varied to ensure sufficient mechanical strength of the solid-state membrane. Thinner membranes increase the overall bulk diffusion rate for a given solid-state membrane. To exploit this phenomena, thinner solid-state membranes may be supported by one or more porous layers. The minimum thickness of a supported dense layer of the subject solid-state membranes suitable for use in this invention is about 0.005 mm, preferably about 0.01 mm, most preferably about 0.02 mm. The maximum thickness of a supported dense layer of the subject solid-state membrane will depend upon the particular application to be practiced and the particular solid-state membrane configuration used. The minimum thickness of a dense layer which is not supported by one or more porous layers is about 0.1 mm to 2 mm depending upon the total pressure differential applied across the solid-state membrane and particular membrane configuration used.

A self-supporting solid-state membrane can be prepared by compressing a calcined and ground powder of the enumerated mixed conducting multicomponent metallic oxide into the desired shape according to procedures known in the art, followed by sintering to a density greater than 95% of theoretical density. Care should be taken to ensure that the solid-state membrane is free from cracks and through-porosity which would greatly diminish or destroy the selectivity achieved by the fluid separation device. Suitable solid-state membranes can also be fabricated by slip or tape casting and injection molding processes according to procedures known in the art.

The solid-state membranes employed in the claimed fluid separation devices preferably include additional layers such as porous support layers which provide mechanical support for the dense mixed conducting multicomponent metallic oxide layer. Moreover, additional layers may be employed as desired in order to assist in operation of the solid-state membrane. A variety of suitable solid-state membrane configurations which include one or more porous support layers are presented in U.S. Pat. No. 5,240,480, assigned to Air Products and Chemicals, Inc., (the "'480 Patent")

The membranes of the '480 Patent have a composite structure comprising a dense mixed conducting multicomponent metallic oxide layer and one or more porous layers of such specified mixed conducting oxides oriented such that enhanced oxygen flux is observed compared to prior art solid state membranes.

Preferred solid-state membranes of the present invention comprise one or more multicomponent metallic oxide porous layers having an average pore radius of less than about 10 micrometers and a mixed conducting multicomponent metallic oxide dense layer having no connected through porosity wherein the porous and dense layers are contiguous and such layers conduct electrons and oxygen ions at operating temperatures. Preferably, a number of porous layers are used wherein the average pore radius of each respective layer gradually increases as a function of distance away from the dense mixed conducting multicomponent metallic oxide layer of the solid-state membrane, with no limit on the maximum average pore radius. Porous layers which are not contiguous with the dense multicomponent metallic oxide layer may be formed of an "inert" material which does not conduct electrons or oxygen ions at membrane operating temperatures.

Alternately, the solid-state composite membrane may comprise a dense mixed conducting multicomponent metallic oxide layer which is sandwiched between a plurality of porous multicomponent metallic oxide layers. Preferably, the porous layers adjacent to both sides of the dense mixed conducting oxide layer have an average pore radius of less than about 10 micrometers. The porous and dense layers of the solid-state membrane are formed from one or a mixture of two or more multicomponent metallic oxides comprising an oxide of at least two different metals or a mixture of at least two different metal oxides wherein the multicomponent metallic oxide demonstrates electron conductivity as well as oxygen ion conductivity at temperatures greater than about 500° C.

Porous layers of the solid-state membrane can be fabricated by starting with a green state formed of a plurality of layers wherein each respective layer comprises successively larger particles. A solid-state membrane comprising a dense mixed conducting multicomponent metallic oxide layer which is supported by a porous layer can be fabricated by laminating green tapes of successively larger particle sizes and cosintering to densify the layer with the smallest particle size. A preferred technique for manufacturing ultrathin solid state membranes is presented in U.S. Pat. Ser. No. 5,160,618 issued Nov. 3, 1992, which is assigned to Air Products and Chemicals, Inc., Allentown, Pa.

The porous layers may be fabricated from an inert material in the sense that the material does not conduct oxygen ions and/or electrons at process operating conditions, or a mixed conducting multicomponent metallic oxide material of the same or different composition with respect to the dense mixed conducting multicomponent metallic oxide layer of the solid-state membrane. Preferably, the dense layer comprises a mixed conducting multicomponent metallic oxide and the porous layers comprise a mixed conducting multicomponent metallic oxide.

Representative examples of suitable materials for fabricating inert porous layers of the solid-state membrane include alumina, ceria, silica, magnesia, titania, a high temperature oxygen compatible metal alloy, a metal oxide stabilized zirconia and compounds and mixtures thereof. Such porous layers are typically fabricated from a material having thermal expansion properties which are compatible with the dense mixed conducting multicomponent metallic oxide layer of the solid-state membrane.

The fluid separation devices of the present invention can be used for a variety of processes including the separating of any ionizable component from a feedstream wherein such ionizable component is capable of being transported through the dense mixed conducting multicomponent metallic oxide layer of the solid-state membrane. For example, the ionizable component may be oxygen present in air wherein oxygen ions are passed through the enumerated dense layer of the fluid separation device. Hydrogen can also be separated from a feed stream by fabricating the dense mixed conducting multicomponent metallic oxide layer from a ceramic which is capable of transporting the hydrogen species. A preferred process for separating oxygen from air in which the fluid separation devices of the present invention may be deployed is presented in U.S. Pat. No. 5,516,359, assigned to Air Products and Chemicals, Inc., wherein oxygen is separated from air by a high temperature ion transport membrane which is integrated with a gas turbine system for energy recovery from the membrane nonpermeate stream. Air is compressed, heated in a first heating step, and passed through the feed side of a mixed conductor membrane zone to produce a high purity oxygen product on the permeate side of the membrane zone. Nonpermeate gas from the membrane zone is heated in a second heating step and passed through a hot gas turbine for power recovery. The operating temperatures of the membrane zone and the expansion turbine are independently maintained by controlling the rate of heat addition in the first and second heating steps, whereby the membrane zone and expansion turbine are thermally delinked for maximum oxygen recovery efficiency.

Another preferred process for separating oxygen from air in which the fluid separation devices of the present invention may be deployed is presented in U.S. Pat. No. 5,565,017, assigned to Air Products and Chemicals, Inc., wherein oxygen is separated from air by a high temperature ion transport membrane which is integrated with a gas turbine system for energy recovery from the membrane nonpermeate stream. Air is compressed, heated in a first heating step, and passed through the feed side of a mixed conductor membrane zone to produce a high purity oxygen product on the permeate side of the membrane zone. Nonpermeate gas from the membrane zone is heated in a second heating step and passed through a hot gas turbine for power recovery. Water is added to the nonpermeate gas prior to the hot gas turbine to increase mass flow to the turbine and thus balance the mass flows of the air feed compressor and the expansion turbine. The operating temperatures of the membrane zone and the expansion turbine are independently maintained by controlling the rate of heat addition in the first and second heating steps and by controlling the rate of water addition, whereby the membrane zone and expansion turbine are thermally delinked for maximum oxygen recovery efficiency.

Another preferred process for separating oxygen from air in which the fluid separation devices of the present invention may be deployed is presented in U.S. Pat. No. 5,657,624, assigned to Air Products and Chemicals, Inc., wherein a high-temperature ion transport membrane system is integrated with a combustion turbine system. Coproduction of oxygen and electric power is achieved in an alternative embodiment by integrating a combined cycle power generation system with an ion transport membrane system. The design performance of the gas turbine in the combined cycle system is maintained by controlled water injection into the membrane non-permeate stream, all or a portion of which optionally is introduced into the gas turbine combustor. Water can be introduced directly into the combustor air inlet. Alternatively, makeup air is added to the membrane feed to maintain the performance of the gas turbine. NOx formation is reduced by introducing the oxygen-depleted nonpermeate from the membrane system to the gas turbine combustor.

The fluid separation devices of the present invention may be used to produce synthesis gas wherein the fluid separation device is directly or indirectly heated to a temperature ranging from 700° to 1000° C., preferably from 800° to 1000° C. A feedstock comprising light hydrocarbons such as methane, natural gas, ethane or any available light hydrocarbon mixture is introduced into the first compartment of the device and an oxygen-containing gaseous mixture is introduced into the second compartment of the device. The feedstock residing in the first compartment of the device contacts oxygen species which are formed at the surface of the solid-state membrane of the fluid device separation resulting in formation of synthesis gas.

The feedstock to be utilized in carrying out a synthesis gas process is preferably natural gas which may be utilized straight from the wellhead or produced industrially by making a composition having about 70 percent by weight of methane, about 10 percent by weight of ethane, 10 percent to 15 percent by weight of carbon dioxide with the balance comprising smaller amounts of propane, butane and nitrogen. The feedstock may optionally be diluted with any inert diluent such as nitrogen, helium and the like. Catalysts known in the art for producing synthesis gas may be incorporated into the first compartment of the device.

The fluid separation devices of the present invention may also be utilized to produce unsaturated hydrocarbons. The fluid separation device is operated in a manner analogous to the description provided regarding synthesis gas wherein the fluid separation device is directly or indirectly heated to a temperature in excess of 500°, preferably from 800° to 1100° C. The feedstock for producing unsaturated hydrocarbons may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Catalysts known in the art for producing unsaturated hydrocarbons may be incorporated into the first compartment of the device.

EXPERIMENTAL SECTION

The following examples are provided to further illustrate embodiments of the present invention and are not intended to limit the scope of the attached claims.

EXAMPLE 1
Preparation of a Solid-State Membrane Comprising a Dense Mixed Conducting Multicomponent Metallic Oxide Layer Formed From $La_{0.6}Sr_{0.4}Co_{1.02}O_{3-z}$ A fluid separation device having at least one solid-state membrane may be fabricated wherein the dense mixed conducting multicomponent metallic oxide layer of the solid-state membrane is formed from $La_{0.6}Sr_{0.4}Co_{1.02}O_{3-z}$. This composition represents a so-called B-site rich composition which means that $(y+y')/(x+x')$ is greater than 1.0. This composition was prepared by a powder preparation technique wherein 1.2789 parts by weight $La_2O_3$, 0.7726 parts by weight $SrCO_3$ and 1 part by weight CoO were ball milled together for 24 hours. The mixture was then fired to 1100° C. for 24 hours followed by cooling to room temperature. The mixture was then ground by ball milling for 24 hours and refired in air to 1100° C. for 24 hours followed by cooling to room temperature. The material possessed a perovskite crystal structure as determined by X-ray diffraction.

The perovskite was ball milled to about a 1–5 micrometer particle size and combined with a plasticizer, binder and toluene solvent to form a slip suitable for tape casting. The slip was cast into a tape and dried using conventional methods. Disks were cut from the tape using standard methods and were fired in air in a controlled manner to remove the plasticizer, binder and solvent and to sinter the disks into solid-state membranes comprising a dense mixed conducting multicomponent metallic oxide layer of $La_{0.6}Sr_{0.4}Co_{1.02}O_{3-z}$ having a thickness of about 350 micrometers.

EXAMPLE 2
Preparation of a Solid-State Membrane Comprising a Dense Mixed Conducting Multicomponent Metallic Oxide Layer Formed From $La_{0.8}Sr_{0.2}Co_{1.02}O_{3-z}$ A fluid separation device having at least one solid state membrane may be fabricated wherein the dense mixed conducting multicomponent metallic oxide layer of the solid-state membrane is formed from $La_{0.8}Sr_{0.2}Co_{1.02}O_{3-z}$. This composition is another example of a B-site rich composition where $(y+y')/(x+x')$ is greater than 1.0. This composition was prepared by a powder preparation technique wherein 1.7052 parts by weight $La_2O_3$, 0.3863 parts by weight $SrCO_3$ and 1 part by weight CoO were ball milled together for 24 hours.

The mixture was then fired to 1100° C. for 24 hours followed by cooling to room temperature. The mixture was then ground by ball milling for 24 hours and retired in air to 1100° C. for 24 hours followed by cooling to room temperature. The material possessed a perovskite crystal structure as determined by X-ray diffraction. The perovskite was ball milled to about a 1–5 micrometer particle size and combined with a plasticizer, binder and toluene solvent to form a slip suitable for tape casting. The slip was cast into a tape and fabricated into a solid-state membrane according to the procedure enumerated in Example 1. The resulting solid-state membrane comprising a dense mixed conducting multicomponent metallic oxide layer of $La_{0.8}Sr_{0.2}Co_{1.02}O_{3-z}$ had a thickness of about 500 micrometers.

EXAMPLE 3
Preparation of a Solid-State Membrane Comprising a Dense Mixed Conducting Multicomponent Metallic Oxide Layer Formed From $La_{0.6}Sr_{0.4}Co_{0.51}Fe_{0.51}O_{3-z}$ A fluid separation device having at least one solid-state membrane may be fabricated wherein the dense mixed conducting multicomponent metallic oxide layer of the solid-state membrane is formed from $La_{0.6}Sr_{0.4}Co_{0.51}Fe_{0.51}O_{3-z}$. This composition is another example of a B-site rich composition where $(y+y')/(x+x')$ is greater than 1.0. This composition was prepared by a powder preparation technique wherein 2.5578 parts by weight $La_2O_3$, 1.5453 parts by weight $SrCO_3$, 1.0656 parts by weight $Fe_2O_3$ and 1 part by weight CoO were ball milled together for 24 hours. The mixture was then fired to 1100° C. for 24 hours followed by cooling to room temperature.

The mixture was then ground by ball milling for 24 hours and refired in air to 1100° C. for 24 hours followed by cooling to room temperature. The material possessed a perovskite crystal structure as determined by X-ray diffraction. The perovskite was ball milled to about a 1–5 micrometer particle size and combined with a plasticizer, binder and toluene solvent to form a slip suitable for tape casting. The slip was cast into a tape and fabricated into a solid-state membrane according to the procedure enumerated in Example 1. The resulting solid-state membrane comprising a dense mixed conducting multicomponent metallic oxide layer of $La_{0.6}Sr_{0.4}Co_{0.51}Fe_{0.51}O_{3-z}$ had a thickness of about 500 micrometers.

EXAMPLE 4 (Comparative)
Preparation of a Solid-State Membrane Comprising a Dense Mixed Conducting Multicomponent Metallic Oxide Layer Formed From $(La_{0.6}Sr_{0.4})_{1.02}CoO_{3-z}$ A fluid separation device having a single solid-state membrane was fabricated wherein the dense mixed conducting multicomponent metallic oxide layer of the solid-state membrane was formed from $(La_{0.6}Sr_{0.4})_{1.02}CoO_{3-z}$. This composition is an example of an A-site rich composition where (y+y')/(x+x') is less than 1.0. This composition was prepared by a powder preparation technique wherein 1.331 parts by weight $La_2O_3$, 0.8039 parts by weight $SrCO_3$ and 1 part by weight CoO were ball milled together for 24 hours.

The mixture was then fired to 1100° C. for 24 hours followed by cooling to room temperature. The mixture was then ground by ball milling for 24 hours and refired in air to 1100° C. for 24 hours followed by cooling to room temperature. The material possessed a perovskite crystal structure as determined by X-ray diffraction. The perovskite was ball milled to about a 1–5 micrometer particle size and combined with a plasticizer, binder and toluene solvent to form a slip suitable for tape casting. The slip was cast into a tape and dried using conventional methods. Disks were cut from the tape and fabricated into solid-state membranes according to the procedure of Example 1. The resulting solid-state membrane comprising a dense mixed conducting multicomponent metallic oxide layer of $(La_{0.6}Sr_{0.4})_{1.02}CoO_{3-z}$, having a thickness of about 300 micrometers.

EXAMPLE 5
Preparation of a Solid-State Membrane Comprising a Dense Mixed Conducting Multicomponent Metallic Oxide Layer Formed From $La_{0.5}Sr_{0.5}Co_{1.02}O_{3-z}$ A fluid separation device having at least one solid-state membrane may be fabricated wherein the dense mixed conducting multicomponent metallic oxide layer of the solid-state membrane is formed from $La_{0.5}Sr_{0.5}Co_{1.02}O_{3-z}$. This composition is an example of a so-called B-site rich composition where (y+y')/(x+x') is greater than 1.0. This composition was prepared by a powder preparation technique wherein 1.0658 parts by weight $La_2O_3$, 0.9658 parts by weight $SrCO_3$ and 1 part by weight CoO were ball milled together for 24 hours. The mixture was then fired to 1100° C. for 24 hours followed by cooling to room temperature. The mixture was then ground by ball milling for 24 hours and refired in air to 1100° C. for 24 hours followed by cooling to room temperature. The material possessed a perovskite crystal structure as determined by x-ray diffraction. The perovskite was ball milled to about a 1–5 micrometer particle size and combined with a plasticizer, binder and toluene solvent to form a slip suitable for tape casting. The slip was cast into a tape and dried using conventional methods. Disks were cut from the tape and fabricated into solid-state membranes according to the procedure of Example 1. The resulting solid-state membrane comprising a dense mixed conducting multicomponent metallic oxide layer of $La_{0.5}Sr_{0.5}Co_{1.02}O_{3-z}$ had a thickness of about 500 micrometers.

EXAMPLE 6
Preparation of a Solid-State Membrane Comprising a Dense Mixed Conducting Multicomponent Metallic Oxide Layer Formed From $La_{0.2}Sr_{0.8}Co_{1.02}O_{3-z}$ A fluid separation device having at least one solid-state membrane may be fabricated wherein the dense mixed conducting multicomponent metallic oxide layer of the solid-state membrane is formed from $La_{0.2}Sr_{0.8}Co_{1.02}O_{3-z}$. This composition is another example of a B-site rich composition where (y+y')/(x+x') is greater than 1.0. This composition was prepared by a powder preparation technique wherein 0.4263 parts by weight $La_2O_3$, 1.5453 parts by weight $SrCO_3$ and 1 part by weight CoO were ball milled together for 24 hours. The mixture was then fired to 1100° C. for 24 hours followed by cooling to room temperature.

The mixture was then ground by ball milling for 24 hours and refired in air to 1100° C. for 24 hours followed by cooling to room temperature. The material possessed a perovskite crystal structure as determined by x-ray diffraction. The perovskite was ball milled to about a 1–5 micrometer particle size and combined with a plasticizer, binder and toluene solvent to form a slip suitable for tape casting. The slip was cast into a tape and dried using conventional methods. Rectangular sections were cut from the tape using standard methods. Several rectangular sections were laminated together to form a thicker rectangular bar. The bar was fired in air in a controlled manner to remove the plasticizer, binder and solvent and to sinter the tape into solid-state membrane comprising a dense mixed conducting multicomponent metallic oxide layer of $La_{0.2}Sr_{0.8}Co_{1.02}O_{3-z}$ having a thickness of 1 millimeter.

EXAMPLE 7 (Comparative).
Preparation of a Solid-State Membrane Comprising a Dense Mixed Conducting Multicomponent Metallic Oxide Layer Formed From $La_{0.2}Sr_{0.8}(Co_{0.4}Fe_{0.4}Cu_{0.2})_{1.02}O_{3d}$ A fluid separation device having one solid-state membrane was fabricated wherein the dense mixed conducting multicomponent metallic oxide layer of the solid-state membrane was formed from $La_{0.2}Sr_{0.8}(Co_{0.4}Fe_{0.4}Cu_{0.2})_{1.02}O_{3d}$. This composition is an example of a B-site rich composition where (y+y'+y")/(x+x') is greater than 1.0. This composition was prepared by a powder preparation technique wherein 1.95 parts by weight $La_2O_3$, 7.07 parts by weight $SrCO_3$, 1.84 part by weight CoO, 1.96 parts by weight $Fe_2O_3$, and 1.00 parts by weight CuO were ball milled together for 24 hours.

The mixture was then fired to 1000° C. for 24 hours followed by cooling to room temperature. The mixture was then ground by ball milling for 24 hours and refired in air to 1000° C. for 24 hours followed by cooling to room temperature. The material possessed a perovskite crystal structure as determined by x-ray diffraction. The perovskite was ball milled to about a 1–5 micrometer particle size and combined with a plasticizer, binder and toluene solvent to form a slip suitable for tape casting. The slip was cast into a tape and dried using conventional methods. Rectangular sections were cut from the tape using standard methods. Several rectangular sections were laminated together to form a thicker rectangular bar.

The bar was fired in air in a controlled manner to remove the plasticizer, binder and solvent and to sinter the tape into solid-state membrane comprising a dense mixed conducting multicomponent metallic oxide layer of $LaO_2Sr_{0.8}(Co_{0.4}Fe_{0.4}Cu_{0.2})_{1.02}O_{3d}$ having a thickness of about 1 millimeter.

EXAMPLE 8
Rate of Oxygen Transport Demonstrated by Solid-State Membranes formed from A-site Rich and B-site Rich Multicomponent Metallic Oxides Under Elevated Carbon Dioxide and Water Partial Pressures The oxygen transport properties of fluid separation devices comprising the solid-state membranes formed from dense mixed conducting multicomponent metallic oxides prepared in Examples 1 and 4 were examined in the presence of a feed stream containing elevated carbon dioxide and water partial pressures. A fluid separation device was prepared by sealing each respective enumerated solid-state membrane to a dense alumina tube to form a first compartment which was separated from a second compartment by the membrane and heating the fluid separation device to 850° C.

A flowing stream of air was introduced into the first compartment of each respective fluid separation device causing air to contact the first surface of each solid-state membrane. A flowing stream of helium was introduced into the second compartment of each respective fluid separation device causing helium to contact and sweep the second surface of each solid-state membrane. Atmospheric pressure was maintained on both sides of each respective membrane, i.e., the first and second compartments. Oxygen was transported through each respective solid-state membrane from the surface exposed to air to the surface exposed to helium. The oxygen/helium mixture was analyzed using an oxygen analyzer to determine the oxygen transport rate.

During the same experiment, carbon dioxide, oxygen and water vapor were added to the oxygen-containing feed stream placed in contact with the first surface of each respective solid-state membrane. The gases added to the oxygen-containing feed stream were blended such that the ratio of oxygen to water was maintained at 2.4 and the ratio of carbon dioxide to water was maintained at 0.5. The water vapor pressure was increased step wise from 0.09 atm to 0.26 atm with consequent proportional increases in carbon dioxide and oxygen partial pressures. The oxygen flux through the solid-state membrane of each respective fluid separation device was monitored as a function of the feed gas composition using an oxygen analyzer.

The Figure illustrates that the oxygen flux provided by the claimed solid-state membranes comprising dense mixed conducting multicomponent metallic oxide layers formed from B-site rich multicomponent metallic oxides prepared according to Example 1 increases with increasing partial pressures of oxygen, water and carbon dioxide in the feed stream. In contrast, the oxygen flux through the solid-state membranes comprising dense mixed conducting multicomponent metallic oxide layers formed from A-site rich mixed conducting multicomponent metallic oxides of Example 4 (Comparative) did not change as the oxygen content in the feed increased. Those of ordinary skill in the art recognize that increasing the oxygen partial pressure increases the driving force for oxygen transport across the solid-state membrane.

Therefore, the oxygen flux provided by a solid-state membrane having a dense mixed conducting multicomponent metallic oxide layer should increase as the oxygen partial pressure is increased in the feed stream, unless carbon dioxide or water interfere with the transport of oxygen through the solid-state membrane. These experiments demonstrate that the claimed solid fluid separation devices which utilize solid-state membranes comprising a B-site rich dense mixed conducting multicomponent metallic oxide layer provide superior flux performance over solid-state membranes prepared from the so-called A-site rich multicomponent metallic oxides when contacted with gaseous mixtures containing carbon dioxide and water.

EXAMPLE 9

Measurement of Creep Rates of the Solid-State Membranes Formed From Dense Mixed Conducting Multicomponent Metallic Oxides of Examples 6 and 7

The solid-state membranes prepared according to Examples 6 and 7 were individually placed in an apparatus using a four point bend arrangement to measure creep rate. The solid-state membranes were heated to 900° C. and a 4000 psi stress was applied to the bottom outer skin of each solid-state membrane. The deflection of each solid-state membrane was measured as a function of time, from which the strain rate was calculated. The solid-state membrane of Example 7 (Comparative) having a dense layer formed from $La_{0.2}Sr_{0.8}(Co_{0.4}Fe_{0.4}Cu_{0.2})_{1.02}O_{3-d}$, had an average creep rate of $1.78 \times 10^{-5}$ in/in/min at a stress level of 4000 psi at 900° C. In contrast, the solid-state membrane of Example 6 having a dense layer formed from $La_{0.2}Sr_{0.8}Co_{1.02}O_{3-d}$, where B=Co, had an average creep rate of only $1.54 \times 10^{-6}$ in/in/min at a stress level of 4000 psi at 900° C. Therefore, the solid-state membranes of Example 6 demonstrate an order of magnitude lower creep rate than the solid-state membranes formed from dense mixed conducting multicomponent metallic oxide having three "B" cations.

One of ordinary skill in the art will recognize that in typical operation, solid-state membranes for oxygen separation will be subjected to mechanical stress due to the feed pressure of the oxygen-containing gaseous mixture to the membrane being higher than the permeate pressure. Compositions with lower creep rates will deform less under the applied stress and will have a longer life time in service.

EXAMPLE 10

Measurement of the $SO_2$ Resistance of Solid-State Membranes Formed From Dense Mixed Conducting Multicomponent Metallic Oxides of Examples 1 and 4

The reactivity to $SO_2$ of solid-state membranes having a dense layer formed from the mixed conducting multicomponent metallic oxides prepared in Examples 1 and 4 was examined in the following experiments. The solid-state membranes were placed side by side in a retort and heated to 950° C. in flowing air. Sulfur dioxide gas was blended with the air feed to the retort such that the partial pressure of sulfur dioxide was $10^{-6}$ atm. After 7 days in this atmosphere, the solid-state membranes were cooled and removed from the retort. The surfaces of the solid-state membranes were examined using a scanning electron microscope and energy dispersive spectrometry. The surface of the solid state membrane formed from the A-site rich mixed conducting multicomponent metallic oxide according to Example 4 (Comparative) was found to be covered with a second phase consisting of Sr-S-O based on the energy dispersive spectrometry analysis. The surface of the solid-state membrane having a dense layer formed from the B-site rich mixed conducting multicomponent metallic oxide of Example 1 was found to be free of second phases and consisting of the $La_{0.6}Sr_{0.4}CoO_{3-z}$ starting material only.

One of ordinary skill in the art will recognize that in typical operation, membranes for oxygen separation may be subjected to sulfur dioxide partial pressures of up to $10^{-6}$ atm due to the natural occurrence of $SO_2$ in air. Additional $SO_2$ may also be introduced if sulfur-containing fuels are combusted in the feed fluid to preheat the fluid to be separated. Oxygen flux performance and membrane lifetime can be negatively affected by reaction with these components. Therefore solid-state membrane comprising a dense mixed conducting multicomponent metallic oxide layer formed from the enumerated B-site rich multicomponent metallic oxides will provide a longer life time in service due to their having lower reactivity to $SO_2$.

The fluid separation devices of the present invention overcome problems associated with prior art devices which exhibit poor resistance to degradation by process feedstreams containing elevated carbon dioxide, sulfur dioxide and water partial pressures. Thus, the solid-state membranes compositions of the present invention are particularly suited toward use in oxygen separation devices wherein high carbon dioxide and water partial pressures and the presence of sulfur dioxide shall be employed. Applicants set forth their invention as described in the claims which are appended hereto.

We claim:

1. A fluid separation device capable of separating oxygen from an oxygen containing gaseous mixture which utilizes at least one solid-state membrane comprising a dense mixed conducting multicomponent metallic oxide layer formed from a mixed conducting multicomponent metallic oxide represented by the formula $$Ln_x A'_{x'} A''_{x''} B_y B'_{y'} O_{3-z},$$

wherein Ln is an element selected from the f block lanthanides, A' is selected from Group 2, A'' is selected from Groups 1, 2 and 3 and the f block lanthanides, and B,B' are independently selected from the d block transition metals, excluding titanium and chromium, wherein $0 \leq x<1$, $0<x' \leq 1$, $0 \leq x''<1$, $0<y<1.1$, $0 \leq y'<1.1$, $x+x'+x''=1.0$, $1.1>y+y'>1.0$ and z is a number which renders the compound charge neutral.

2. The fluid separation device according to claim 1 wherein Ln is a mixture of lanthanum and at least one element other than lanthanum which is selected from the f block lanthanides.

3. The fluid separation device of claim 1 wherein the dense mixed conducting multicomponent metallic oxide is represented by the formula $La_x A'_{x'} A''_{x''} Co_y Fe_y O_{3-z}$ wherein A' is selected from strontium, barium, calcium or magnesium, A'' is selected from Groups 1, 2 and 3 and the f block lanthanides, wherein $0 \leq x<1$, $0<x'<1$, $0 \leq x''<1$, $0<y<1.1$, $0 \leq y'<1.1$, $x+x'+x''=1.0$, $1.1>y+y'>1.0$ and z is a number which renders the composition charge neutral.

4. The fluid separation device according to claim 3 wherein the dense mixed conducting multicomponent metallic oxide is $La_{0.6}Sr_{0.4}Co_{0.51}Fe_{0.51}O_{3-z}$.

5. A fluid separation device which utilizes at least one membrane comprising a dense mixed conducting multicomponent metallic oxide layer formed from a mixed conducting multicomponent metallic oxide represented by the formula $$Ln_x A'_{x'} A''_{x''} B_y O_{3-z},$$

wherein Ln is an element selected from the f block lanthanides, A' is selected from Group 2, A'' is selected from Groups 1, 2 and 3 and the f block lanthanides, and B is selected from the d block transition metals, excluding titanium and chromium, wherein $0 \leq x<1$, $0<x' \leq 1$, $0 \leq x''<1$, $x+x'+x''=1.0$, $1.1>y>1.0$ and z is a number which renders the compound charge neutral.

6. The fluid separation device of claim 5 wherein the dense mixed conducting multicomponent metallic oxide is $La_{0.5}Sr_{0.5}Co_{1.02}O_{3-z}$.

7. The fluid separation device of claim 5 wherein the dense mixed conducting multicomponent metallic oxide is $La_{0.6}Sr_{0.4}Co_{1.02}O_{3-z}$.

8. The fluid separation device of claim 5 wherein the dense mixed conducting multicomponent metallic oxide is $La_{0.8}Sr_{0.2}Co_{1.02}O_{3-z}$.

* * * * *

UNITED STATES PATENT AND TRADEMARK OFFICE
CERTIFICATE OF CORRECTION

PATENT NO. : 6,056,807
DATED : May 2, 2000
INVENTOR(S) : Carolan, et al.

It is certified that error appears in the above-indentified patent and that said Letters Patent is hereby corrected as shown below:

Claim 1, the formula should be -- $Ln_x A'_{x'} A''_{x''} B_y B'_{y'} O_{3-z}$, --

Claim 3, the formula should be -- $La_x A'_{x'} A''_{x''} Co_y Fe_{y'} O_{3-z}$ --

Claim 5, the formula should be -- $Ln_x A'_{x'} A''_{x''} B_y O_{3-z}$, --

Signed and Sealed this

Twenty-seventh Day of February, 2001

Attest:

NICHOLAS P. GODICI

Attesting Officer     Acting Director of the United States Patent and Trademark Office